US008028779B2

(12) United States Patent
Morishita et al.

(10) Patent No.: US 8,028,779 B2
(45) Date of Patent: Oct. 4, 2011

(54) HYBRID VEHICLE

(75) Inventors: Naohisa Morishita, Saitama (JP);
Toshiyuki Yumoto, Saitama (JP);
Kazuyuki Iwata, Saitama (JP); Kenji Honda, Saitama (JP); Junji Urano, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 302 days.

(21) Appl. No.: 11/819,839

(22) Filed: Jun. 29, 2007

(65) Prior Publication Data

US 2008/0006467 A1  Jan. 10, 2008

(30) Foreign Application Priority Data

Jul. 4, 2006  (JP) .................................. 2006-184475
Jul. 4, 2006  (JP) .................................. 2006-184565

(51) Int. Cl.
*B60W 10/04* (2006.01)
(52) U.S. Cl. ............. 180/65.265; 180/65.28; 180/65.285
(58) Field of Classification Search ............... 180/65.25, 180/65.23, 65.235, 65.28, 65.6, 65.7, 365
See application file for complete search history.

(56) References Cited

U.S. PATENT DOCUMENTS

| 5,775,449 | A |   | 7/1998 | Moroto et al. |         |
|-----------|---|---|--------|---------------|---------|
| 5,943,918 | A | * | 8/1999 | Reed et al.   | 74/661  |
| 6,059,059 | A |   | 5/2000 | Schmidt-Brucken |       |
| 6,110,066 | A | * | 8/2000 | Nedungadi et al. | 475/5 |
| 6,138,784 | A | * | 10/2000 | Oshima et al. | 180/65.26 |
| 6,429,541 | B2 | * | 8/2002 | Takenaka et al. | 290/40 C |
| 6,565,473 | B2 | * | 5/2003 | Endo et al. | 475/117 |
| 6,621,175 | B1 | * | 9/2003 | Kuroda et al. | 290/40 D |
| 6,644,427 | B2 | * | 11/2003 | Schulte | 180/65.25 |
| 7,028,794 | B2 | * | 4/2006 | Odahara et al. | 180/65.25 |
| 7,059,435 | B2 | * | 6/2006 | Niki et al. | 180/65.25 |
| 7,282,004 | B2 | * | 10/2007 | Raghavan et al. | 475/5 |
| 2002/0091034 | A1 | * | 7/2002 | Nakamori et al. | 477/3 |
| 2005/0246082 | A1 | * | 11/2005 | Miki et al. | 701/50 |

FOREIGN PATENT DOCUMENTS

| EP | 0904971 A1 | 9/1998 |
| EP | 0 990 793 A2 | 4/2000 |
| EP | 1068978 A1 | 1/2001 |
| EP | 1 586 477 A2 | 10/2005 |
| JP | S61-57204 B | 12/1986 |
| JP | 11-93723 | 4/1999 |
| JP | 2942533 B2 | 6/1999 |
| JP | 2004-112995 A | 4/2004 |
| JP | 2006-184475 | 7/2006 |
| JP | 2006-184565 | 7/2006 |

* cited by examiner

*Primary Examiner* — Jeffrey J Restifo
*Assistant Examiner* — Erez Gurari
(74) *Attorney, Agent, or Firm* — Arent Fox LLP

(57) ABSTRACT

The present invention provides a hybrid vehicle including a first transmission path that transmits a traction of an engine to driving wheels and a second transmission path that transmits a traction of a motor to the driving wheels, and the hybrid vehicle runs by alternatively selecting either the first or second transmission path or in combination thereof. The first transmission path has a first reduction gear ratio that is defined to be smaller than a reduction gear ratio at which a maximum vehicle speed can be achieved by the traction of the engine alone.

14 Claims, 7 Drawing Sheets

FIG.4

| RUNNING MODE | CLUTCH | CLUTCH DISC BRAKE | VEHICLE SPEED RANGE |
|---|---|---|---|
| SERIES DRIVING (MOTOR TRACTION) | OFF | OFF | $0 \sim V_1$ |
| ENGINE TRACTION AT ACCELERATION STAGE | OFF | ON | $V_1 \sim V_2$ |
| TRACTION BY DIRECT COUPLING WITH ENGINE | ON | OFF | $V_2 \sim V_4$ |
| PARALLEL DRIVING | ON | OFF | $V_4 \sim V_{max}$ |

HYBRID VEHICLE

CROSS-REFERENCE TO RELATED APPLICATION

This application claims the foreign priority benefit under 35 U.S.C. §119 of Japanese Patent Application No. 2006-184565 filed on Jul. 4, 2006, and Japanese Patent Application No. 2006-184475 filed on Jul. 4, 2006, the disclosures of which are incorporated herein by reference.

BACKGROUND OF THE INVENTION

1. Field of the Invention

The present invention relates to a hybrid vehicle running in combination of traction of an engine (internal combustion) and traction of a motor (electric motor), particularly to a hybrid vehicle provided with a first transmission path that transmits engine traction to driving wheels and a second transmission path that transmits a motor traction to the driving wheels.

2. Description of the Related Art

Conventionally, it has been well-known that a hybrid vehicle runs by utilizing characteristics of each traction of an engine and a motor, in which a second transmission path that transmits the motor traction to the driving wheels is used when the vehicle speed is less than a given value (vehicle speed V1); a combination of a first transmission path that transmits the engine traction to the driving wheels and the second transmission is used when the vehicle speed is V1 or more; and the hybrid vehicle runs chiefly through the first transmission path transmitting the engine traction to the driving wheels when the vehicle speed reaches around the maximum speed Vmax. In such a hybrid vehicle, as disclosed in JPB2942533 (Paragraph [0015] to [0028], FIGS. 1, 2), for example, a gear ratio of the first transmission path is defined such that the characteristic of the engine traction covers the maximum speed Vmax, thereby to simplify a transmission system of the vehicle without providing a transmission mechanism which has a variable gear ratio for the first and second transmission paths. Accordingly, when the vehicle speed reaches around the maximum speed Vmax, the vehicle runs with the engine traction trough the first transmission path to the driving wheels.

However, according to such a hybrid vehicle disclosed in JPB2942533 (Paragraphs [0015] to [0028] and FIGS. 1, 2), in a steady running state with a smaller load (cruising), the vehicle is designed to run in a series driving mode in which the engine generates electric power, whereby the motor drives the driving wheels, or to run by using the first transmission path that includes a transmission device in which a reduction gear ratio is defined to be relatively greater (lower gear ratio) in order to achieve the maximum speed Vmax by using the engine traction.

However, there are such disadvantages: fuel efficiency of the vehicle may become lowered since transmission efficiency of the traction becomes relatively lowered; in addition, when running with the engine traction alone through the first transmission path including a transmission device in which a lower gear ratio is defined, the vehicle runs at the lower gear ratio to realize engine traction characteristics that achieves the maximum vehicle speed Vmax. Since the rotational rate of the engine significantly varies depending on the vehicle speed in a steady running state, it is difficult to select a region of the engine rotational rate that can provide higher fuel efficiency for the steady running state.

In particular, in a combination of an engine traction and a motor traction in a hybrid vehicle having a large displacement volume engine, such a large displacement volume engine has a greater excess traction, resulting in significant deterioration in fuel efficiency in the first transmission path including the transmission device in which a lower gear ratio is defined, as described above. In combination with this large displacement volume engine, even though the large displacement volume multi-cylinder engine is provided with an output characteristics variable mechanism for a variable displacement or the like in order to enhance fuel efficiency, it is difficult to make the most of this output characteristics variable mechanism performing a variable displacement for fuel efficiency enhancement at the lower gear ratio defined as described above.

JPB2942533 mentioned nothing about a driver's selection of a running condition by using a shift lever or the like; therefore, it is impossible to cope with a situation against the driver's will.

In the light of the above-mentioned disadvantages, it is desirable to provide a hybrid vehicle that enhances fuel efficiency of the vehicle as well as allowing a driver to select a running condition that meets his or her will.

SUMMARY OF THE INVENTION

In one aspect of the present invention, there is provided a hybrid vehicle including a first transmission path that transmits a traction of an engine to driving wheels and a second transmission path that transmits a traction of a motor to the driving wheels, and the hybrid vehicle runs by alternatively selecting either the first or second transmission path or in combination thereof The first transmission path has a first reduction gear ratio that is defined to be smaller than a reduction gear ratio at which a maximum vehicle speed can be achieved by the traction of the engine alone.

In another aspect of the present invention, there is provided that a hybrid vehicle including a first transmission path that transmits a traction of an engine to driving wheels and a second transmission path that transmits a traction of a motor to the driving wheels, and the hybrid vehicle runs by alternatively selecting either the first or second transmission path or in combination thereof. The first transmission path has a first reduction gear ratio that is defined to be smaller than a reduction gear ratio at which a maximum vehicle speed can be achieved by the traction of the engine alone, and the first and second transmission paths includes a common output gear that transmits at least one of the traction of the engine and the traction of the motor to the driving wheels. Within a first vehicle speed range from a first vehicle speed not including a vehicle stop state to a maximum vehicle speed that can be achieved by the traction of the engine alone, at least the traction of the motor is transmitted through the second transmission path to the driving wheels, and within a second vehicle speed range from a second vehicle speed that is lower than the first vehicle speed to less than the first vehicle speed, the traction of the engine is transmitted through the first transmission path to the driving wheels when the hybrid vehicle is in a steady running state.

Other features and advantages of the present invention will become more apparent from the following detailed description of the invention when taken in conjunction with the accompanying exemplary drawings.

BRIEF DESCRIPTION OF THE DRAWINGS

FIG. 4 shows various combinations of ON and OFF between a clutch and a clutch disc brake to switch the engine traction of the hybrid vehicle according to the second embodiment transmitted to driving wheels through a first transmission path so as to shift a speed of the vehicle.

DETAILED DESCRIPTION OF THE PREFERRED EMBODIMENTS

First Embodiment

Figure 1:
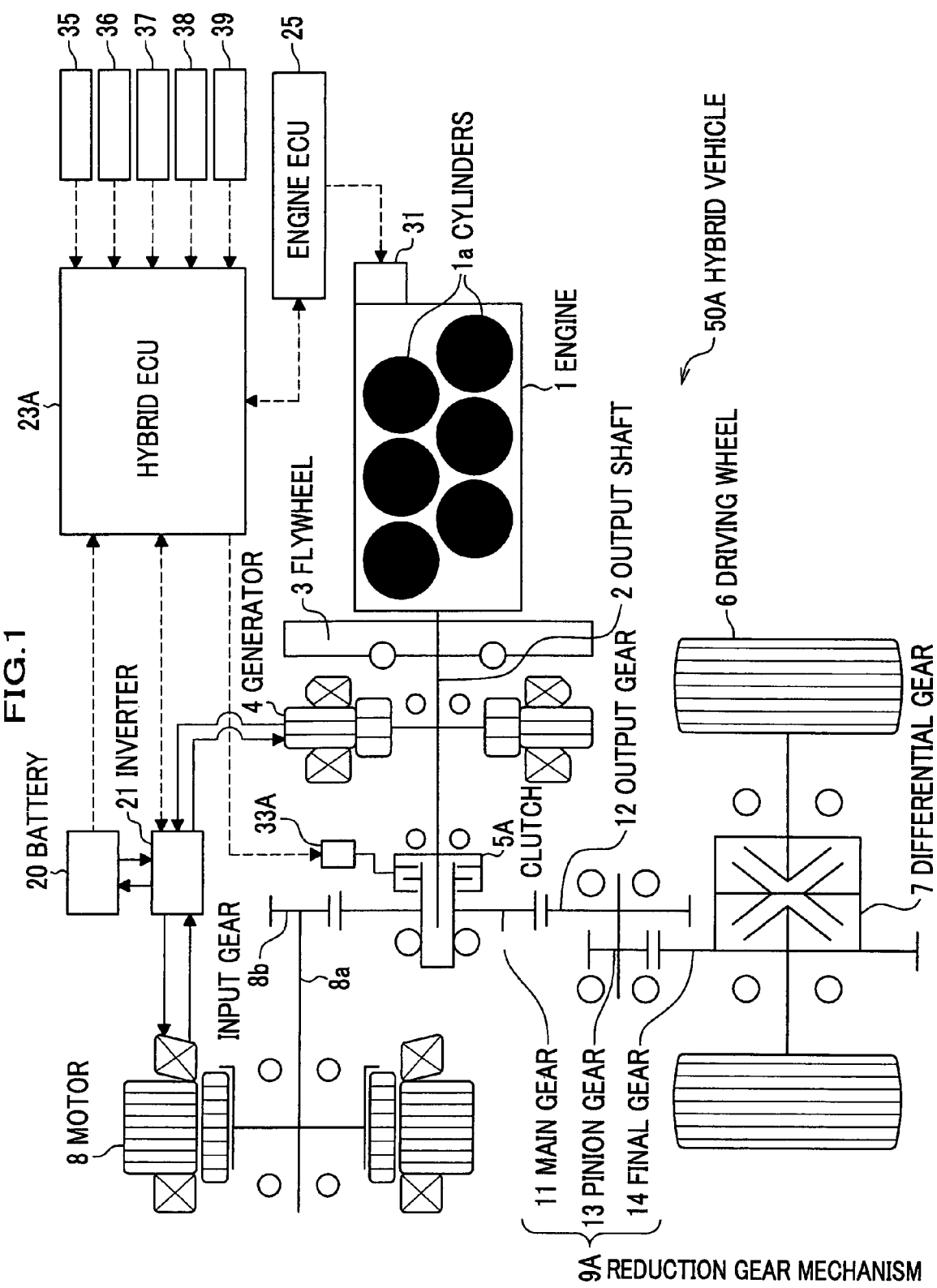
FIG. 1 is a block diagram of an entire hybrid vehicle according to a first embodiment of the present invention.
Figure 2:
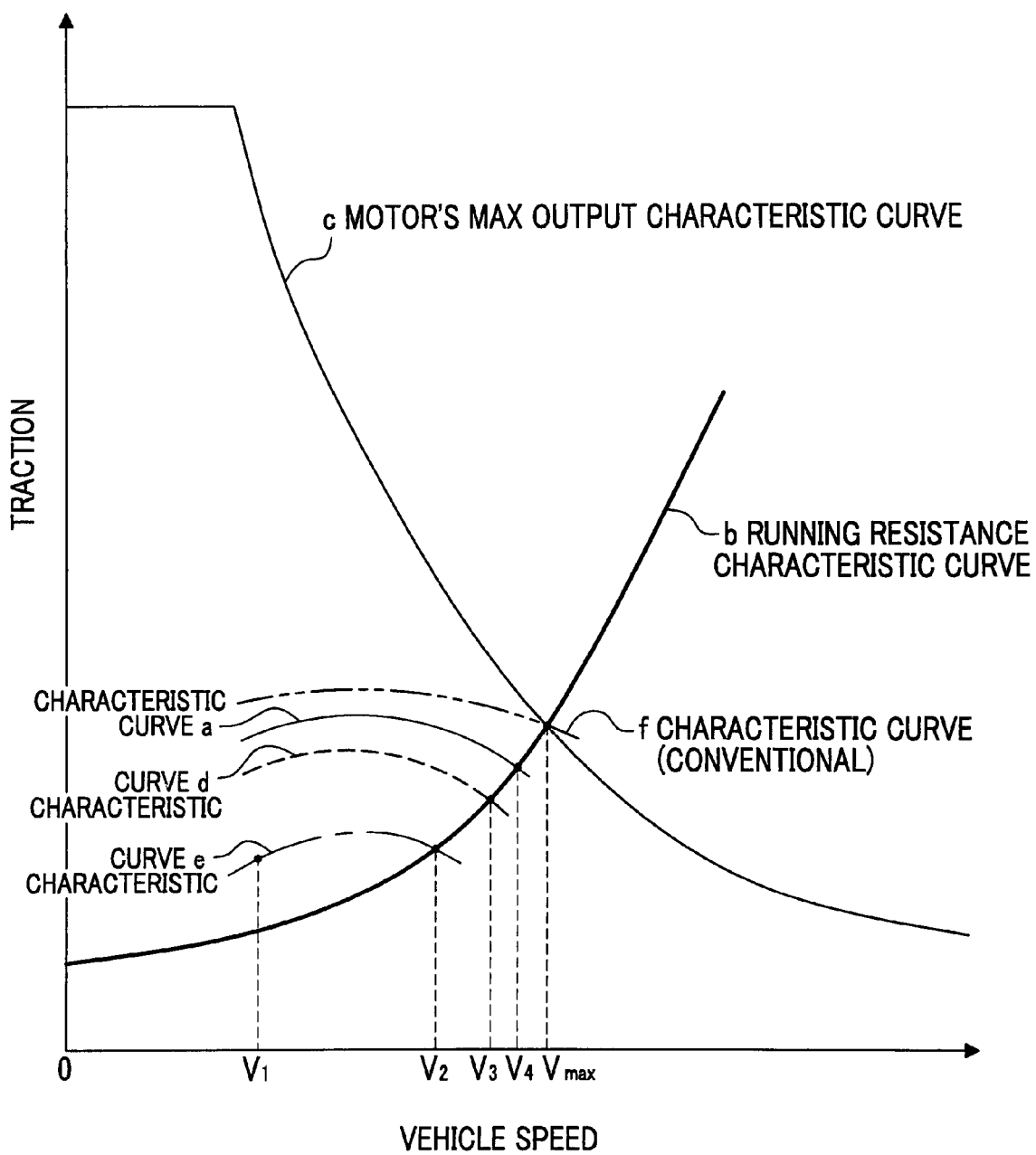
FIG. 2 is a graph of various traction characteristics of the hybrid vehicle according to the first embodiment of the present invention.
Figure 5:
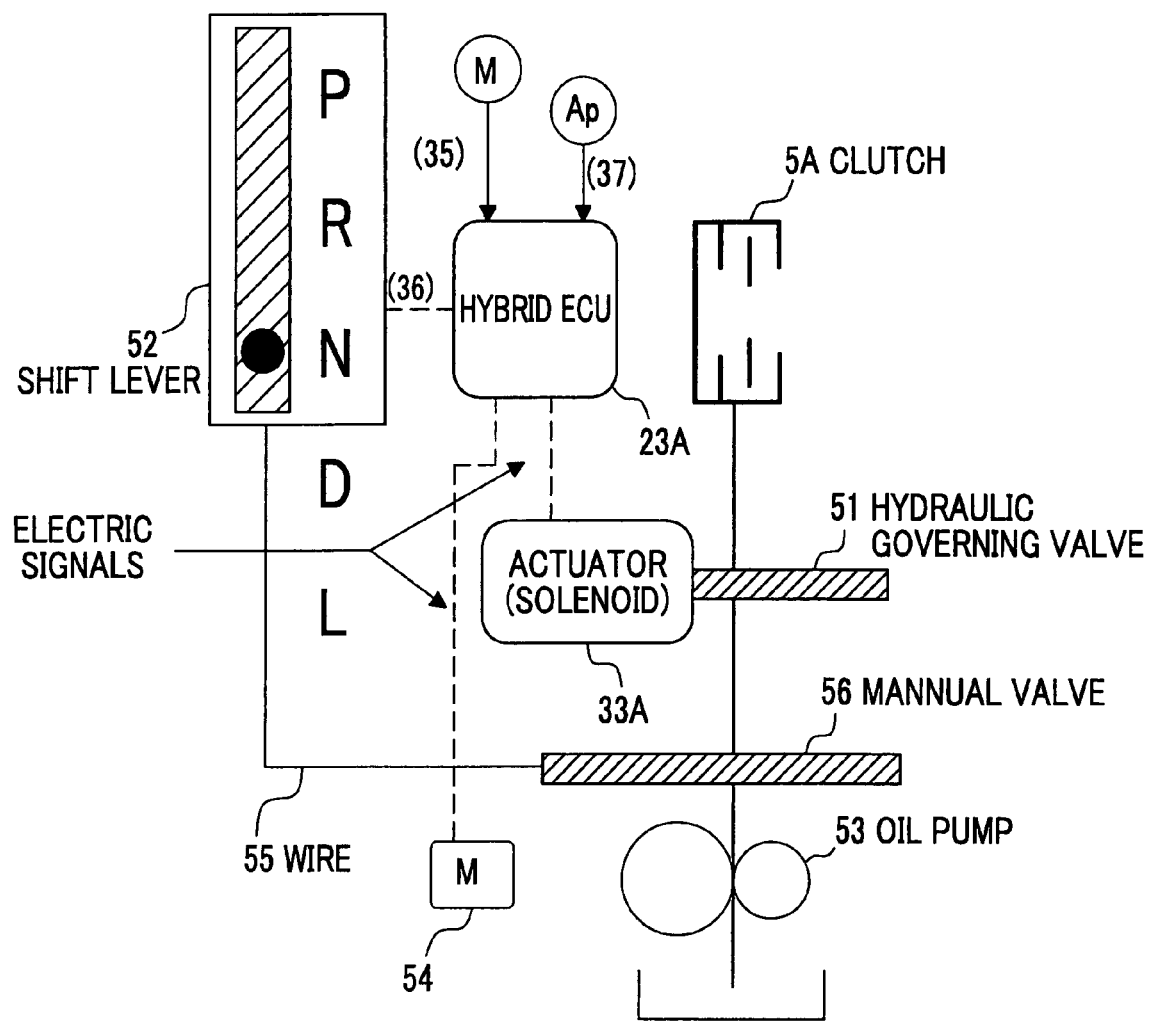
FIG. 5 is a block diagram for explaining a control of a connection/disconnection means of the hybrid vehicle of the first embodiment.

With reference to FIGS. 1, 2 and 5, descriptions will be given on a hybrid vehicle according to a first embodiment of the present invention.

FIG. 1 is a block diagram of an entire hybrid vehicle according to the first embodiment, which shows each transmission path of a motor traction and an engine traction by using fixed gears.

FIG. 2 is a graph of various traction characteristics of the hybrid vehicle according to the first embodiment, in which a horizontal axis indicates vehicle speed and a vertical axis indicates traction or running resistance.

FIG. 5 is a block diagram explaining a control of a connection/disconnection means of the hybrid vehicle of the first embodiment.

The hybrid vehicle 50A of the first embodiment includes a first transmission path that transmits traction of an engine 1 to driving wheels 6, and a second transmission path that transmits traction of a motor 8 to the driving wheels 6, so as to drive the vehicle 50A by alternatively selecting either the first or second transmission path or in combination thereof.

As shown in FIG. 1, an output shaft 2 of the engine 1 including multi-cylinders, for example, 6 cylinders is directly coupled with a generator 4 serving also as a sell motor through a fly wheel 3, and is further connected with a clutch 5A that serves for transmitting the traction of the engine 1 to the driving wheels 6.

Next, the first transmission path will be described as follows.

The first transmission path includes the output shaft 2, the clutch 5A, a main gear 11 that is connected or disconnected with the output shaft 12 through this clutch 5A, an output gear 12 that meshes with this main gear 11, a pinion gear 13 that is driven coaxially to this output gear 12, a final gear 14 that meshes with this pinion gear 13, and differential gear 7 to which the traction is input from this final gear 14 to drive the driving wheels 6. Through this first transmission path, the traction of the engine 1 is transmitted to the driving wheels 6.

The clutch 5A is an oil clutch, and is set to ON or OFF by an actuator 33A. Driving force of the engine 1 is transmitted to the driving wheels 6 when the clutch 5A is ON (connected state), and is disconnected therefrom when the clutch 5A is OFF (open state). If a greater traction is needed, the clutch 5A is set to OFF and the traction of the motor 8 is transmitted to the driving wheels 6, as described later.

The first transmission path provides a first reduction gear ratio of the present invention, which is fixed and defined by a product of a gear ratio between the main gear 11 and the output gear 12 and a gear ratio between the pinion gear 13 and the final gear 14, having no transmission device providing a variable gear ratio. The main gear 11, the output gear 12, the pinion gear 13 and the final gear 14 constitute the transmission mechanism 9A effecting on the traction of the engine 1 to the driving wheels 6.

In addition, as shown in FIG. 5, in a case where a driver moves a shift lever 52 to a "L" range, a hybrid ECU 23A activates the actuator 33A with electric signals, thereby to operate a hydraulic pressure governing valve 51. At this time, this hydraulic pressure governing valve 51 controls hydraulic pressure so as to control ON/OFF of the clutch 5A such that the clutch 5A is set to OFF in an open state, thereby to disconnect transmission of the traction of the engine 1 to the driving wheels 6 and to connect transmission of the traction of the motor 8 to the wheels 6. An oil pump 53 serves for supplying oil for the clutch 5A, driven by the motor M54 in accordance with electric signals from the hybrid ECU 23A.

Then, if the shift lever is positioned to the "L" range, for example, the hybrid ECU 23A activates the actuator 33A to actuate the hydraulic pressure governing valve 51 so that the clutch 5A is set to OFF.

The shift lever 52 is mechanically connected through a wire 55 with a manual valve 53 installed in a hydraulic circuit that is provided between the clutch 5A and the oil pump 53. Therefore, when the shift lever 52 is moved to the "L" range, the clutch 5A may also be set to OFF by mechanically closing the manual valve 56 together with the wire 55, not in response to instructions from the hybrid ECU23A.

In the hybrid vehicle 50A according to the first embodiment, the first reduction gear ratio of the transmission mechanism 9A is defined such that: when the vehicle 50A is in the steady running state, the traction characteristics of the engine 1 approximately at the maximum output, as represented by a characteristic curve a of FIG. 2, is lower than a running resistance characteristic curve b in the vicinity of the maximum vehicle speed Vmax and can reach at most the vehicle speed V4, resulting from a relation between a rotational rate and torque of the engine 1 corresponding to a vehicle speed at the first reduction gear ratio. In other words, the gear ratio of the transmission mechanism 9A is previously fixed to provide smaller engine traction than that at a gear ratio, in which the hybrid vehicle 50A can achieve the maximum vehicle speed Vmax with the engine 1 alone. Briefly, it is designed that the hybrid vehicle 50A cannot reach the maximum vehicle speed Vmax with the traction of the engine 1 alone.

It should be noted that the running resistance characteristic curve b of FIG. 2 is represented by including various resistances that increase depending on the vehicle speed, such as rolling resistance and air resistance.

"In a steady running state" denotes a case in which the vehicle speed is accelerated and then falls within the moderate/higher vehicles speed range (also referred to as a "second vehicle speed range") from the vehicle speed V1 (second vehicle speed) to less than V4 (first vehicle speed).

As shown in FIG. 1, the motor 8 is driven with power supplied from the generator 4 or the battery 20 through the inverter 21, and motor shaft 8a thereof is directly coupled with the input gear 8b that meshes with the main gear 11.

Next, the second transmission path will be described hereinafter.

The second transmission path includes an input gear 8b, a main gear 11, an output gear 12 that meshes with this main gear 11, a pinion gear 13 that is driven coaxially to this output gear 12, a final gear 14 that meshes with this pinion gear 13, and a differential gear 7 to which the traction is input from this final gear 14 so as to drive the driving wheels 6. Through this second transmission path, the traction of the motor 8 is transmitted to the driving wheels 6.

The second transmission path provides a reduction gear ratio of the present invention, which is fixed and defined by a product of a gear ratio between the input gear 8b and the main gear 11, a gear ratio between the main gear 11 and the output gear 12 and a gear ratio between the pinion gear 13 and the final gear 14, having no transmission device providing a variable gear ratio.

The maximum output characteristics of the motor 8 are represented by a maximum output characteristic curve c of FIG. 2. The maximum output characteristic curve c shows that the motor 8 provides the maximum traction from the start point to a given point of a lower vehicle speed of the hybrid vehicle 50A, and thereafter the traction suddenly drops as the vehicle speed increases, that is to say, as the rotation rate of the motor 8 increases. In the vicinity of the maximum vehicle speed Vmax of the hybrid vehicle 50A, the maximum output characteristics of the motor 8 exceed the running resistance characteristic curve b. This shows that the traction characteristics of the motor 8 are defined such that the hybrid vehicle 50A can reach the maximum vehicle speed Vmax with the motor 8 alone.

As shown in FIG. 1, there is provided the hybrid ECU (Electric Control Unit) 23A in order to control a driving state of the hybrid vehicle 50A of this embodiment. The following signals are input to the hybrid ECU 23A: ignition-switch signals from an ignition switch 35, shift-position signals from a shift lever position sensor 36 provided on the shift lever (not shown in the drawing), an accelerator-pedal depression amount signals from an accelerator pedal position sensor 37 provided on an accelerator pedal (not shown in the drawing), a brake-pedal depression amount signals from a brake pedal position sensor 38 provided on a brake pedal (not shown in the drawing), and vehicle speed signals from a vehicle speed sensor 39 provided on the wheels.

There are provided on a battery 20 various sensors (not shown) for detecting output voltages, output currents and a battery temperature, etc., and respective sensor signals therefrom are input to the hybrid ECU23A.

The hybrid ECU23A controls the actuator 33A that executes a connection or disconnection of the clutch 5A in response to the accelerator-pedal depression amount and the brake-pedal depression amount that are obtained based on the vehicle speed signals.

Through the inverter 21, the hybrid ECU 23A controls the generator 4 also serving as the cell motor and the motor 8 that can generate power, and controls operations of the engine 1 through an engine ECU 25 that controls an output characteristic variable mechanism 31.

The hybrid ECU 23A and the engine ECU 25 are coupled with each other through a communication line. The sift position signals, the accelerator-pedal depression amount signals, the brake-pedal depression amount signals and the vehicle speed signals are input to the engine ECU 25 other than control signals output from the hybrid ECU 23A. On the other hand, the engine ECU 25 detects rotational rate of the engine 1 and outputs it to the hybrid ECU 23A through the communication line.

The output characteristic variable mechanism 31, for example, includes a mechanism providing a variable control on lift amount and open/close timing of the valves (not shown) provided over cylinders 1a of the engine 1; a mechanism providing a variable cylinder control for variable displacement that stops some valves of the cylinders 1a (variable displacement operation); an electric circuit providing an ignition timing control; and a mechanism and an electric circuit providing a fuel injection control.

A characteristic curve d of FIG. 2 shows traction characteristics of the engine 1 at an approximately maximum output during a variable displacement operation, where the output characteristic variable mechanism 31 stops three on one bank side of the six cylinders of the engine 1 and operates the other three on the other bank side. With only the traction of the engine 1 that is lowered in such a variable displacement operation, the vehicle 50A can reach at most the vehicle speed V3 at the first reduction gear ratio.

Control on Transmission Paths Switching

In the above described construction, the hybrid ECU 23A drives the hybrid vehicle 50A by switching the first and second transmission paths in accordance with vehicle speed, as follows.

In a lower vehicle speed range from 0 to less than V1 (second vehicle speed) including starting time as shown in FIG. 2, in a gradient running or when a driver moves the shift lever 52 to the "L" range, the hybrid ECU 23A controls the actuator 33A such that the clutch 5A disconnects the main gear 11 from the output shaft 2 on the engine 1 side, and controls the inverter 21 such that the motor 8 drives the driving wheels 6 through the second transmission path. At this time, the motor 8 is driven by power supplied from the battery 20. If the battery 20 is not sufficiently charged, the hybrid ECU 23A controls the inverter 21 and the engine ECU 25 such that the generator 4 functions as a cell motor, thereby to start the engine 1. Then, the hybrid ECU 23A controls the inverter 21 such that the engine 1 drives the generator 4 to generate power, by which the motor 8 is driven. It should be noted that, when the driver moves the shift lever 52 (see FIG. 5) to the "L" range during a parallel driving mode (described later), the driving mode shifts from the parallel driving mode to the series driving mode as described above.

The maximum output characteristics of the motor 8 is represented by the maximum output characteristic curve c of FIG. 2, where the motor 8 provides a traction that exceeds the running resistance characteristic curve b up to the vicinity of Vmax, and this traction of the motor 8 enables the hybrid vehicle 50A to run in the above mentioned lower vehicle speed range.

In the steady running state within the moderate/higher vehicle speed range from V1 to less than V4, the hybrid ECU 23A controls the actuator 33A such that the clutch 5A connects with the output shaft 2 on the engine 1 side, and controls the inverter 21 mostly not to operate the motor 8, so that only the traction of the engine 1 is transmitted to the driving wheels 6 through the first transmission path. At this time, the traction of the driving wheels 6 follows the characteristic curve a or the characteristic curve d of FIG. 2. In a case of the variable displacement operation, the hybrid vehicle 50A can run at most up to V3 in a traction range that exceeds the running resistance characteristic curve b. Therefore, the engine ECU 25 controls the output characteristic variable mechanism 31 to switch an operation between the six-cylinder driving and the three-cylinder driving for the sake of a greatest fuel efficiency.

It should be noted that the motor 8 is idling during this operation.

In acceleration driving at the moderate/higher vehicle speed from V1 to less than V4, the hybrid ECU 23A controls the inverter 21 to make the motor 8 assist the traction of the engine 1. On the other hand, in a deceleration driving within this vehicle speed range, the hybrid ECU 23A controls the inverter 21 to make the motor 8 regenerate power.

Next, when the vehicle speed falls within the highest vehicle speed range (first vehicle speed range) from V4 (first vehicle speed) up to Vmax, the hybrid ECU 23A controls the actuator 33A to keep clutch 5A connected with the output shaft 2 on the engine 1 side so that the traction of the engine 1 is transmitted to the driving wheels 6 through the first transmission path; at the same time, the hybrid ECU 23A controls the inverter 21 to make the motor 8 operate so that the traction of the motor 8 is transmitted to the driving wheels 6 through the second transmission path, as well. This means that the driving mode shifts to the parallel driving mode, in which the motor 8 assists the drive of the engine 1. At this time, if the battery 20 is not sufficiently charged, the hybrid ECU 23A controls the inverter 21 such that the generator 4 generates power, by which the motor 8 is driven.

Figure 6:
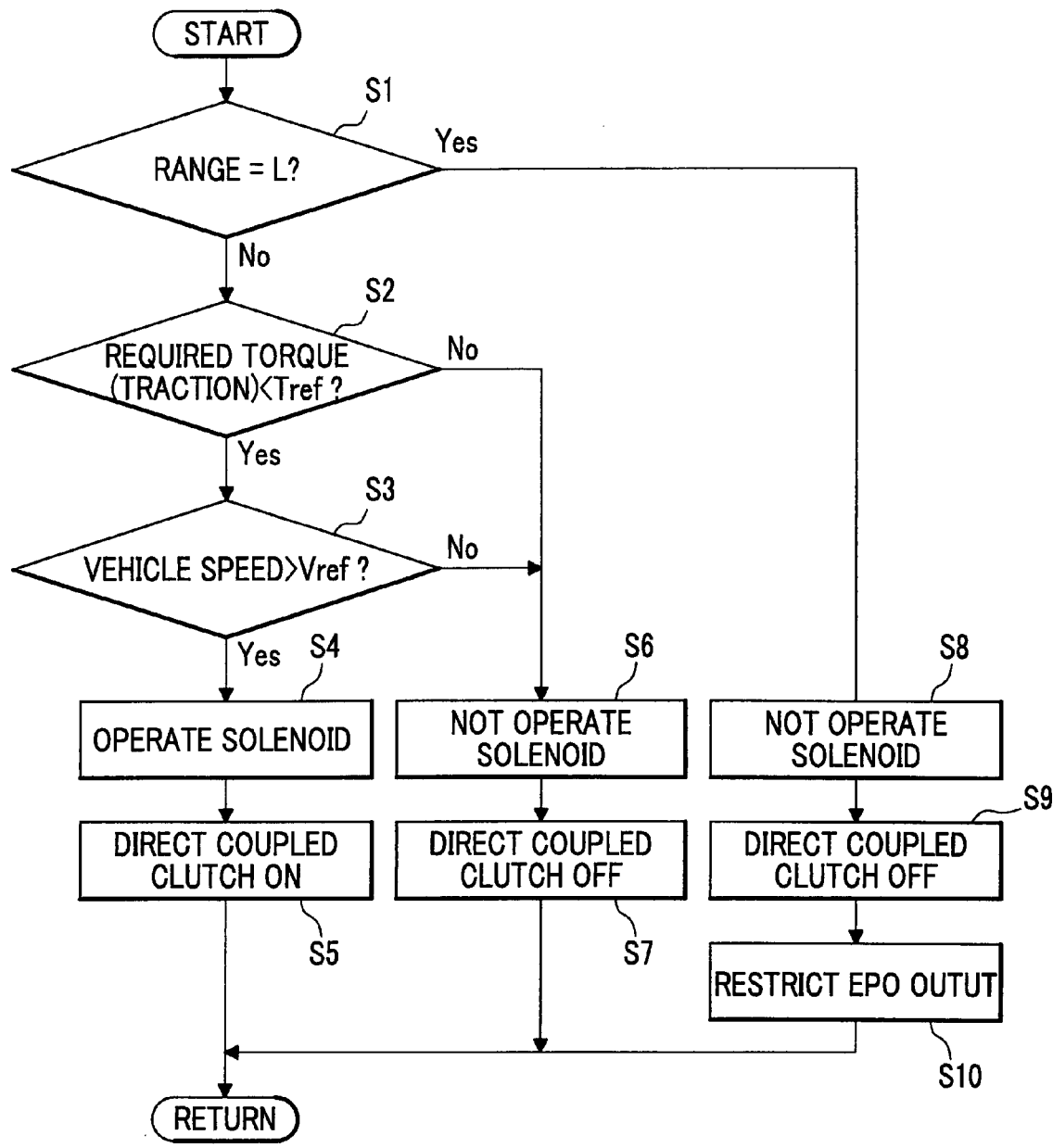
FIG. 6 is a flow chart for explaining process of how to control the connection/disconnection means when the driver performs a demanding operation for a greater traction.

Next, descriptions will be provided on a process when a driver needs a greater traction. FIG. 6 is a flow chart for explaining the process of how to control a connection/disconnection means when the driver performs an operation of demanding a greater traction.

The hybrid ECU 23A (also referred to as just "ECU") determines whether or not the shift range signals indicate the "L" range or not (S1). If it is determined that they indicate for "L" (No at S1), the hybrid ECU 23A shifts the process to S2. If it is determined that they indicate "L" (Yes at S1), the hybrid ECU 23A shifts the process to S8. Then, at S2, the hybrid ECU 23A determines whether or not the required torque is smaller than Tref. If it is determined that the required torque is smaller than Tref (Yes at S2), the hybrid ECU 23A shifts the process to S3. If it is determined that the required torque is not smaller than Tref (No at S2), the hybrid ECU 23A shifts the process to S6. It should be noted that Tref denotes a maximum torque that is obtained through a direct coupling/decoupling with the engine 1, and the required torque denotes a torque for obtaining a required traction.

If determining that the required torque is smaller than Tref (Yes at S2), then the hybrid ECU 23A determines whether or not the vehicle speed value is greater than Vref at S3. f it is determined that the vehicle speed value is Vref or less, it is predicted that the driver requires further acceleration. If determining that the vehicle speed value is greater than Vref (Yes at S3), the ECU 23A operates the solenoid (i.e. actuator 33A) (S4) and sets the directly coupled clutch 5A to ON (S5), and then returns to S1.

If the required torque is greater than Tref (No at S2) or the vehicle speed is smaller than Vref (No at S3), the hybrid ECU 23A does not operate the solenoid (S6) and sets the directly coupled clutch 5A to OFF (S7), and then returns to S7. On the other hand, if determining that the shift range signals are for "L" (Yes at S1), the hybrid ECU 23A does not operate the solenoid (S8), sets the directly coupled clutch 5A to OFF (S9), restricts output of the oil pump (EOP: Electric Oil Pump) 53 (S10), and then returns to S1.

Effects of the First Embodiment

According to the first embodiment, within a lower vehicle speed range from V0 to less than V1, the hybrid vehicle 50A obtains a traction represented by the maximum output characteristic curve c of FIG. 2 from the motor 8 that can generate a greater traction. Therefore, the hybrid vehicle 50A can run easily with this greater traction from the motor 8 in this lower vehicle speed range. Similarly, the traction of the motor 8 can be utilized in a driving that requires a greater traction in a gradient running or the like. In a steady running state within a moderate/higher vehicle speed range from V1 (second vehicle speed) to less than V4 (first vehicle speed), the traction characteristics of the engine 1 represented by the characteristic curve a or d exceeds the running resistance characteristic curve b, which means that the hybrid vehicle 50A can run with the engine 1 alone.

As shown in FIG. 2, the characteristic curve a of the first embodiment represents a lower traction than a traction of the engine 1 represented by the characteristic curve f (conventional), in which the reduction gear ratio of the first transmission path is defined to achieve the maximum vehicle speed Vmax of the hybrid vehicle 50A by only using the traction of the engine 1, as disclosed in JPB2942533. This means the first embodiment allows the engine 1 to operate with a lower rotational load relative to the same running resistance, thereby to enhance fuel efficiency more than the conventional hybrid vehicle as disclosed in JPB2942533. Furthermore, in a case of flat ground running that requires no traction, the hybrid vehicle 50A can run with the traction characteristics of the variable displacement operation represented by the characteristic curve d. In this case, a steady running with higher fuel efficiency can be obtained.

Particularly in combination of the engine traction and the motor traction where the hybrid vehicle 50A has a large displacement volume engine as the engine 1, since the engine 1 has a larger displacement volume, an excess traction becomes greater in the steady running and the transmission mechanism 9A is defined to have a higher ratio than that of the above mentioned conventional hybrid vehicle, thereby to enhance fuel efficiency significantly, compared to the conventional case. In addition, in combination of the large displacement volume engine, the output characteristic variable mechanism 31 including a variable displacement function and the like may be incorporated in the engine 1, so that the engine output can be lowered and rotational rate of the engine 1 with higher fuel efficiency can be obtained, resulting in enhancement of fuel efficiency.

In the maximum vehicle speed range (first vehicle speed range) from V4 (first vehicle speed) up to the maximum vehicle speed Vmax, it is difficult to obtain a desired vehicle speed by using the engine 1 alone. To counter this, the first embodiment utilizes the traction of the motor 8 that assists the traction of the engine 1 through the second transmission path, so as to achieve a desired vehicle speed.

In the hybrid vehicle 50A, transmission of the traction from the engine 1 is disconnected by setting the clutch 5A to OFF when the driver moves the shift lever 52 to the "L" range, and the driving wheels 6 is driven by the traction from the motor 8, so that the hybrid vehicle 50A can run with the greater traction of the motor 8. Accordingly, it is possible to reflect on driving the driver's will that he or she wants to drive the vehicle 50A with a greater traction, indicated by the driver's moving the shift lever to the "L" range.

As described above, in the hybrid vehicle 50A according to the first embodiment, when the driver selects a greater position for the traction requirement (torque requirement), the clutch 5A is opened (OFF) so that it is possible to achieve a series driving (electric traction transmission) state that can provide a constant greater traction.

To counter a trouble such that the hydraulic driven clutch 5A is locked on the coupling side due to a valve failure or something (i.e. hydraulic pressure is constantly applied on the clutch 5A), the hybrid vehicle 50A according to the first embodiment can perform a backup operation, in which the vehicle 50A runs in the series driving (electric traction transmission) mode by moving the shift lever 52 to the "L" range so as to release the hydraulic pressure of the clutch 5A, compared to a conventional case in which only a driving with a smaller traction can be obtained as far as the direct coupling state is maintained.

Second Embodiment

Figure 3:
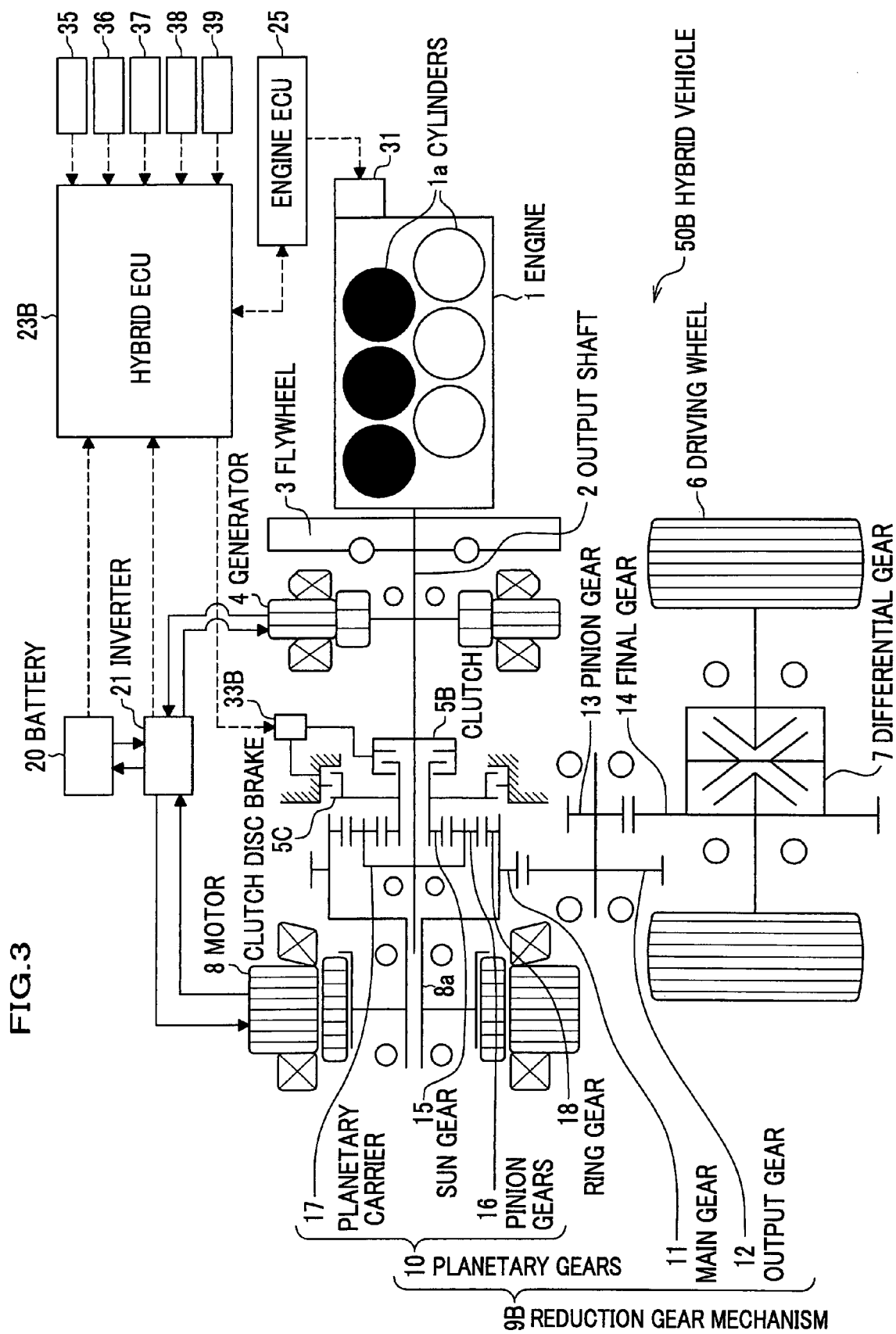
FIG. 3 is a block diagram of an entire hybrid vehicle according to a second embodiment of the present invention.

With reference to FIGS. 3 and 4 (also FIG. 2 if necessary), a hybrid vehicle according to the second embodiment will be described hereinafter.

FIG. 3 is a block diagram of the entire hybrid vehicle according to the second embodiment, showing each transmission path of motor and engine tractions.

The hybrid vehicle 50B according to the second embodiment includes a first transmission path that transmits traction of an engine 1 to driving wheels 6, and a second transmission path that transmits traction of a motor 8 to the driving wheels 6, so as to drive the vehicle 50A by alternatively selecting the first or second transmission paths or in combination thereof. The hybrid vehicle 50B according to the second embodiment is different from the hybrid vehicle 50A according to the first embodiment in that planetary gears (transmission gears) 10 are incorporated, instead of using the direct-coupled clutch 5A. The planetary gears 10 serve as a transmission mechanism that switches two reduction gear ratios of "direct-coupling" and "acceleration". These planet gears 10 includes an actuator 33B that disconnects an output shaft 2 from the first transmission path and controls switching of the reduction gear ratios of the planetary gears 10, a clutch (also referred to as a "connection/disconnection means") 5B driven by the actuator 33B and a clutch disc brake 5C.

Detailed descriptions will be given on the planetary gears 10 hereinafter. The output shaft 2 is directly coupled with a planetary carrier 17 that holds pinion gears 16 of the planet gears 10. An axis of a sun gear 15 that meshes with the pinion gears 16 is connectable/disconnectable with the output shaft 2 through the clutch 5B, and also is switchable between rotation and stop through the clutch disc brake 5C. A ring gear 18 faces inward to mesh with the pinion gears 16, and the axis of the ring gear 18 is directly coupled with a motor axis 8a. There is provided on a body that holds the ring gear 18 a main gear 11 facing outward, which meshes with an output gear 12.

As shown in FIG. 3, the output shaft 2 of the engine 1 including six cylinders is directly coupled through a fly wheel 3 with the generator 4 that also serves as a cell motor, and is further connected with the clutch 5B for transmitting the traction of the engine 1 to the driving wheels 6.

Next, the first transmission path will be described hereinafter.

The first transmission path includes the output shaft 2, the clutch 5B, the main gear 11 provided at the planetary gears 10 that are connected or disconnected with the output shaft 2 by the clutch 5B, the output gear 12 that meshes with the main gear 11, the pinion gear 13 that is driven coaxially to the output gear 12, a final gear 14 that meshes with the pinion gear 13, and a differential gear that is input from the final gear 14 and drives the driving wheels 6. Through this first transmission path, the traction of the engine 1 is transmitted to the driving wheels 6.

The planetary gears 10, the main gear 11, the output gear 12, the pinion gear 13 and the final gear 14 constitute a transmission mechanism 9B that works on the traction of the engine 1 to the driving wheels 6.

The reduction gear ratio of the first transmission path is switchable between the two reduction gear ratios in accordance with operations of the clutch 5B and the clutch disc brake 5C, as follows.

In a case where the clutch 5B is set to ON and the clutch disc brake 5C is set to OFF, the axis of the sun gear 15 included in the planetary gears 10 and the axis of the planetary carrier 17 are fixed by the clutch 5B, whereby the sun gear 15 and the planetary carrier 17 are integrally rotated, so that the reduction gear ratio of the planetary gears 10 becomes 1. In the second embodiment, the reduction gear ratio defined by a product of a gear ratio between the main gear 11 and the output gear 12 and a gear ratio between the pinion gear 13 and the final gear 14 is defined as a first reduction gear ratio that has the same value of the first embodiment. This means that the traction characteristics of the engine 1 based on the first reduction gear ratio of the transmission mechanism 9B is defined in the same manner as the first embodiment.

In another case where the clutch 5B is set to OFF and the clutch disc brake 5C is set to ON, rotation of the axis of the sun gear 15 of the planetary gears 10 is stopped by the clutch disc brake 5C; in accordance with the rotation of the planetary carrier 17 around the sun gear 15, the pinion gears 16 rotate in the same direction of the planetary carrier 17, so as to accelerate rotational rate of the ring gear 18 in the same rotational direction thereof. At this time, the reduction gear ratio of the first transmission path is defined by multiplying a reduction gear ratio between the planetary carrier 17 and the ring gear 18 that are in an acceleration state, a gear ratio between the main gear 11 and the output gear 12 and a gear ratio between the pinion gear 13 and the final gear 14; and this reduction gear ratio of the first transmission path is defined as a second reduction gear ratio, which is smaller that the above first reduction gear ratio.

The second reduction gear ratio has a smaller value than that of the first reduction gear ratio, and the traction characteristic of the engine based on the second reduction gear ratio, as similar to the traction characteristics of the six-cylinder driving as represented by the characteristic curve e of FIG. 2, is defined to be up to the maximum vehicle speed V2, which is lower than the maximum vehicle speed V3 that can be achieved in the variable displacement driving at the first reduction gear ratio at the maximum output. Specifically, the second reduction gear ratio is defined such that the traction of the engine 1 in the six-cylinder driving at the maximum vehicle speed V2 at the second reduction gear ratio is smaller than the traction of the engine 1 in the displacement operation at the maximum vehicle speed V3 at the first reduction gear ratio.

The motor 8 is driven by power supplied through the inverter 21 from the generator 4 or the battery 20, and a motor axis 8a thereof is directly coupled with the main gear 11.

Next, the second transmission path will be described hereinafter.

The second transmission path includes the main gear 11, the output gear 12 that meshes with the main gear 11, the pinion gear 13 that is driven coaxially to the output gear 12, the final gear 14 that meshes with the pinion gear 13, and the differential gear 7 that is input from the final gear 14 and drives the driving wheels 6. Through this second transmission path, the traction of the motor 8 is transmitted to the driving wheels 6.

The second transmission path provides a reduction gear ratio which is fixed and defined by integrating a gear ratio between the main gear 11 and the output gear 12 and a gear ratio between the pinion gear 13 and the final gear 14, having no transmission device providing a variable gear ratio.

There is provided a hybrid ECU 23B for controlling driving condition of the hybrid vehicle 50B according to the second embodiment. The hybrid ECU 23B controls an actuator 33B to control the clutch 5B and the clutch disc brake 5C to be On or OFF individually, in response to acceleration-pedal depression amount and brake-pedal depression amount that are obtained based on the vehicle speed signals. The hybrid ECU 23B has the same constitution as that of the first embodiment other than the above-mentioned points, and is connected to the battery 20, the inverter 21 and the engine ECU 25 via a communication line, through which the same signals and controls are communicated with those components, similar to the ECU 23A of the first embodiment.

As similar to the hybrid ECU 23A of the first embodiment, the hybrid ECU 23B controls ON/OFF of the clutch 5B in response to a driver's instruction to demand a larger traction. Descriptions on the operation timing will be omitted since it is performed in the same process that has been already explained with reference to FIG. 6.

There is provided the output characteristic variable mechanism 31 for the engine 1, as similar to the first embodiment.

For convenience, the same components will be given the same reference numerals in the first embodiment, and duplicated explanations therefor will be omitted.

(Control on Transmission Paths Switching and Speed Shift)

In the above described configuration, depending on the vehicle speed, the hybrid ECU 23B switches the first and second transmission paths and also switches the reduction gear ratios of the first transmission path, so as to drive the hybrid vehicle 50B.

FIG. 4 shows various combinations of ON and OFF between the clutch 5B and the clutch disc brake 5C depending on the driving condition of the hybrid vehicle 50B.

In a lower vehicle speed range from 0 to less than V1 (the second vehicle speed), as shown in FIG. 2 of the traction characteristics graph, in a gradient running or when a driver moves the shift lever 52 to the "L" range, the hybrid ECU 23B controls the actuator 33B to set both the clutch 5B and the clutch disc brake 5C to OFF, so as to put the hybrid vehicle 50B into a series driving mode (motor traction). As shown in FIG. 3, when the clutch 5B and the clutch disc brake 5C are both set to OFF, regardless of whether the planetary carrier 17 stops or rotates, the difference in gear teeth number between the ring gear 18 and the pinion gears 16 are compensated by idling of the sun gear 15, so that the output shaft 2 and the ring gear 18 are put in a disconnection state. In this way, the engine 1 is disconnected from the first transmission path, and hybrid ECU 23B controls the inverter 21 to drive the motor 8 and drive the generator 4 if necessary, and transmits the traction of the motor 8 through the second transmission path to the driving wheels 6. Accordingly, at a starting time when the vehicle speed is lower or at a lower speed running time, the motor driving operation that provides a greater traction is performed to drive the hybrid vehicle 50B.

It should be noted that, if the driver moves the shift lever 52 to the "L" range in a parallel driving mode as described later, the driving mode shifts to this series driving mode from the parallel mode.

Then, when the vehicle speed reaches a steady running state in a vehicle speed range not less than the vehicle speed V1 (second vehicle speed), the hybrid ECU 23B controls the inverter 21 to stop operation of the motor 8, and drives the hybrid vehicle 50B at the second reduction gear ratio, which provides higher fuel efficiency than that of the six-cylinder driving in direct-coupling with the engine 1 represented by the characteristic curve a. Specifically, as shown in FIG. 4, the actuator 33B controls the clutch 5B to be OFF and the clutch disc brake 5C to be ON, so as to boost rotation rate of the output shaft 2 by the planetary gears 10 and then transmit it to the output gear 12 (engine traction at an acceleration stage). At this time, the traction characteristics of the engine 1 at the maximum output are represented by the characteristic curve e of FIG. 2, in which necessary traction can be obtained without a full depression of the acceleration pedal. In a condition where the planetary gears 10 are at an acceleration stage and the reduction gear ratio of transmission mechanism 9B becomes the second reduction gear ratio, the vehicle speed reaches V2 at most as shown in FIG. 2, and the traction at V2 is smaller than the maximum vehicle speed V3 at the maximum output in the variable displacement of the direct coupling with the engine 1.

When the clutch 5B and the clutch disc brake 5C are in the above condition, and if the engine output still has any excess, the engine ECU 25 controls the engine 1 to perform the variable displacement operation.

As shown in FIG. 2, when the vehicle speed reaches the vicinity of V2 or greater, the hybrid ECU 23B controls the actuator 33B such that the clutch 5B is set to ON and the clutch disk brake 5B is set to OFF, so that the sun gear 15 and the planetary carrier 17 rotate together (driven by direct coupling with the engine 1). If a relatively smaller traction is required in a flat ground running or the like and the depression amount of the accelerator pedal becomes smaller, the hybrid ECU 23B determines that a smaller torque is required, so that the engine ECU 25 controls the engine 1 to perform low-output driving in the variable displacement, thereby to provide a low-output engine operation through the variable displacement on one bank side. Accordingly, the rotation of the output shaft 2 is transmitted to the output gear 12 in the direct coupling state without being reduced in rotational rate at the planetary gears 10.

When the vehicle 50B is accelerated or decelerated within the moderate/higher vehicle speed range, the motor 8 performs an assist driving operation or a regenerative operation, as similar to the first embodiment.

Within the maximum vehicle speed range from V4 or more to the maximum vehicle speed Vmax, the hybrid ECU 23B performs the same control of the first embodiment. This means that the driving mode shifts to the parallel driving mode in which the motor 8 assists the driving of the engine 1.

Effect of the Second Embodiment

As described above, in the hybrid vehicle 50B according to the second embodiment, if a greater traction is required in a lower vehicle speed range from 0 to less than V1, both the clutch 5B and the clutch disc brake 5C are set to "OFF" and the driving wheels 6 are driven by the motor 8 alone (series driving mode).

In a steady running state within the moderate/higher vehicle speed range from V1 (second vehicle speed) to less than V4 (first vehicle speed) not including Vmax, the driving wheels 6 are basically driven by the engine 1 alone, and provided with an assist by the motor 8 if necessary when the vehicle 50B is accelerated. Within the highest vehicle speed range (first vehicle speed range) of V4 (first vehicle speed) or more to Vmax, the driving wheels 6 are driven by the engine 1 together with the motor 8 (parallel driving mode).

Therefore, within the moderate/higher vehicle speed range less than Vmax, the hybrid vehicle 50B is operated in a steady driving state by the engine 1 alone, in which the first reduction gear ratio is defined for the vehicle speed range of V4 (first vehicle speed) lower than the maximum vehicle speed of Vmax. As shown in FIG. 2, the characteristic curve a of the second embodiment represents a lower traction than a traction of the engine 1 represented by the characteristic curve f (conventional), in which the reduction gear ratio of the first transmission path is defined to achieve the maximum vehicle speed Vmax of the hybrid vehicle 50B by only using the traction of the engine 1, as disclosed in JPB2942533, as similar to the first embodiment. This means the second embodiment allows the engine 1 to operate with a lower rotational load relative to the same running resistance, thereby to enhance fuel efficiency more than a conventional hybrid vehicle. Furthermore, in a flat ground running that requires a smaller traction, as represented by the characteristic curve d, it is possible to utilize the traction characteristic of the variable displacement operation, which contributes to a steady running with higher fuel efficiency.

Particularly in combination of the engine traction and the motor traction where the hybrid vehicle 50B has a large displacement volume engine as the engine 1, since the engine 1 has a larger displacement volume, an excess traction becomes greater in the steady running and the transmission gears 9B is defined to have a higher ratio than that of the above mentioned conventional hybrid vehicle, thereby to enhance fuel efficiency significantly, compared to the conventional case. In addition, in combination of the large displacement volume engine, the output characteristic variable mechanism 31 including a variable displacement function and the like may be incorporated in the engine 1, so as to enhance fuel efficiency.

Furthermore, the second reduction gear ratio is defined to be smaller than the first reduction gear ratio so that the vehicle speed becomes V2, which is lower than V3 that can be achieved at the maximum output at the first reduction gear ratio when the output of the engine 1 is lowered by the output characteristics valuable mechanism 31.

Specifically, the vehicle speed can be shifted to the second reduction gear ratio that provides a smaller traction at the vehicle speed V2, thereby to provide an engine rotational rate with higher fuel efficiency in a steady running at a lower speed.

In addition, as similar to the first embodiment, when the driver moves the shift lever 52 to the "L" range, the transmission of the traction from the engine 1 is disconnected by setting the clutch 5B to OFF, and drives the driving wheels 6 by the traction from the motor 8, so that the hybrid vehicle 50B can run with a greater traction of the motor 8. Accordingly, it is possible to reflect on the vehicle driving the driver's will that he or she wants to drive the vehicle 50B with a greater traction, which is indicated by the driver's moving the shift lever to the "L" range.

In the second embodiment, within the vehicle speed range from V4 to the maximum vehicle speed Vmax, the motor 8 is used as an assist of the engine driving for the parallel driving, as mentioned above. However, the series driving may be applicable, in which the first transmission path of the engine 1 is disconnected and the engine 1 drives the generator 4 to generate power that drives the motor 8.

In the second embodiment, the motor axis 8a is directly coupled with the main gear 11. However, the traction may be transmitted via the input gear 8b provided at the motor axis 8a to the main gear 11, as similar to the first embodiment.

In the first and second embodiments, the highest vehicle speed range (first vehicle speed range) is defined as V4 or more. However it is not limited to this vehicle speed range in the present invention; and an upper limit of the moderate/higher vehicle speed range (second vehicle speed range) may be defined as an appropriate vehicle speed value lower than V4 at which fuel efficiency becomes higher, so as to lower the vehicle speed value for switching to the assist driving operation by the motor 8 or to the series driving mode.

Variations of First and Second Embodiments

In the first and second embodiments, it is designed that the traction of the motor 8 is transmitted to the main gear 11 through the input gear 8b provided with the motor axis 8a, or is transmitted to the main gear 11 that directly couples with the motor axis 8a; and the traction of the motor 8 covers the vehicle speed range from 0 to less than V1 and the vehicle speed range from V4 to the maximum vehicle speed Vmax.

By the way, in the vehicle speed range from V4 to Vmax, the rotational rate of the motor 8 may exceed 10,000 rpm. It is easy to control the inverter 21 to make the motor 8 rotate at a higher rate. However, this may cause more sever design requirements on mechanical structures for rotors or bearings of the motor 8, etc.; and if rigidity of the motor 8 is enhanced, increase in weight thereof may occur.

As a variation of the first and second embodiments, the motor axis 8a may be provided with a two-stage transmission mechanism so that the rotational rate of the motor axis 8a can be shifted between "direct coupling" and "acceleration", whereby rotation of the motor 8 is transmitted to the main gear 11 through such an output axis of the two-stage transmission mechanism. Since the hybrid ECU 24A or the hybrid ECU 24B selects a speed shift on the two-stage transmission mechanism such that the "direct coupling" stage is selected in the vehicle speed range from 0 to less than V1, and the "acceleration" stage is selected in the vehicle speed range from V4 to Vmax, thereby to enable a driving operation in which the rotation rate of the motor 8 is decreased in the vehicle speed range from V4 to Vmax.

Figure 7:
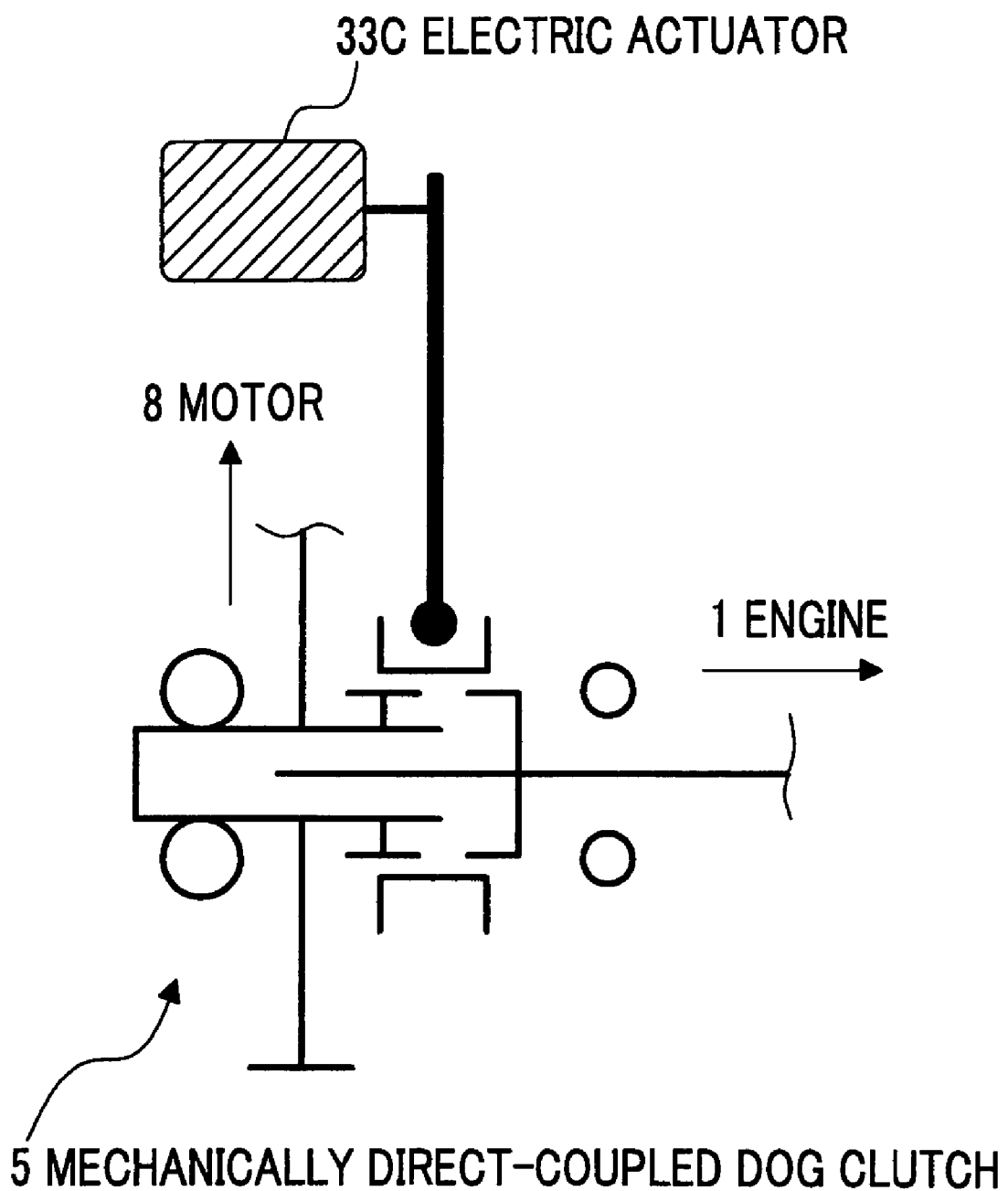
FIG. 7 is a schematic diagram for explaining an essential part of another variation of the first and second embodiments.

Furthermore, FIG. 7 is a schematic diagram for explaining an essential part of another variation of the first and second embodiments. In this variation, there may be provided a mechanically direct-coupled dog clutch 5C instead of using the clutch 5A or 5B, as well as an electric actuator 33C that drives the dog clutch 5C. The electric actuator 33C controls ON/OFF of the mechanically direct-coupled dog clutch 5C.

The embodiments according to the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims.

What is claimed is:

1. A hybrid vehicle comprising a first transmission path that transmits a traction of an engine to driving wheels and a second transmission path that transmits a traction of a motor to the driving wheels, the first transmission path comprising a main gear, an output gear, a pinion gear, and a final gear, the hybrid vehicle running by alternatively selecting either the first or second transmission path or in combination thereof, wherein a clutch switches between the first transmission path and the second transmission path, the clutch directly engaging the output shaft of the engine, and the first transmission path having a non-variable first reduction gear ratio that is fixed throughout a steady running state and is smaller than a reduction gear ratio at which a maximum vehicle speed is achieved by the traction of the engine alone, wherein the first reduction gear ratio is defined by a product of a gear ratio between the main gear and the output gear and a gear ratio between the pinion gear and the final gear.

2. A hybrid vehicle according to claim 1, wherein the maximum vehicle speed is achieved by transmitting only the traction of the motor through the second transmission path to the driving wheels, or by transmitting the traction of the motor through the second transmission path to the driving wheels as well as transmitting the traction of the engine through the first transmission path to the driving wheels.

3. A hybrid vehicle according to claim 1, wherein the engine comprises an output characteristic variable mechanism that varies output characteristics thereof; and the first transmission path comprises transmission gears in which a second reduction gear ratio is defined to be smaller than the first reduction gear ratio and provide a smaller traction than a traction that the engine achieves at a maximum output at the first reduction gear ratio when an output of the engine is lowered by the output characteristic variable mechanism.

4. A hybrid vehicle according to claim 2, wherein the engine comprises an output characteristic variable mechanism that varies output characteristics thereof; and the first transmission path comprises transmission gears in which a second reduction gear ratio is defined to be smaller than the first reduction gear ratio and provide a smaller traction than a traction that the engine achieves at a maximum output at the first reduction gear ratio when an output of the engine is lowered by the output characteristic variable mechanism.

5. A hybrid vehicle according to claim 3, wherein the output characteristic variable mechanism performs a variable displacement operation in which some of cylinders of the engine are stopped during the engine operation.

6. A hybrid vehicle according to claim 4, wherein the output characteristic variable mechanism performs a variable displacement operation in which some of cylinders of the engine are stopped during the engine operation.

7. A hybrid vehicle according to claim 3, wherein the output characteristic variable mechanism performs one of a valve open/close control, an ignition timing control and a fuel injection control.

8. A hybrid vehicle according to claim 4, wherein the output characteristic variable mechanism performs one of a valve open/close control, an ignition timing control and a fuel injection control.

9. A hybrid vehicle according to claim 1, wherein the second transmission path comprises the output gear that transmits at least one of the traction of the engine and the traction of the motor to the driving wheels,
   within a first vehicle speed range from a first vehicle speed not including a vehicle stop state to the maximum vehicle speed that can be achieved by the traction of the engine alone, at least the traction of the motor is transmitted through the second transmission path to the driving wheels, and
   within a second vehicle speed range from a second vehicle speed that is lower than the first vehicle speed to less than the first vehicle speed, the traction of the engine is transmitted through the first transmission path to the driving wheels when the hybrid vehicle is in a steady running state.

10. A hybrid vehicle according to claim 1,
   wherein, if an instruction for demanding greater traction than a predetermined value is input, the clutch disconnects the first transmission path to be into an open state, while maintaining connection of the second transmission path, so as to perform a driving operation only with the traction through the second transmission path.

11. A hybrid vehicle according to claim 10 further comprising:
   an oil pump for supplying hydraulic pressure to the clutch;
   a hydraulic governing valve for regulating the hydraulic pressure in a hydraulic circuit, supplied from the oil pump; and
   an actuator for actuating the hydraulic governing valve by electric signals.

12. A hybrid vehicle according to claim 11, wherein, in the open state of the clutch, a driving force of the actuator is restricted, and the oil pump driving is restricted.

13. A hybrid vehicle according to claim 12, wherein a manual valve supplies the hydraulic pressure from the oil pump, and the manual valve is mechanically connected with a shift lever manipulated by a driver.

14. A hybrid vehicle according to claim 10 further comprising an electric actuator for activating the clutch by electric signals.

* * * * *